(12) United States Patent
Ackleson et al.

(10) Patent No.: US 6,929,214 B2
(45) Date of Patent: Aug. 16, 2005

(54) CONFORMAL AIRLINER DEFENSE (CAD) SYSTEM

(75) Inventors: James E. Ackleson, Palatine, IL (US); Michael A. Guy, McHenry, IL (US); Robert A. Hale, Ellicott City, MD (US); Jeffrey A. Plebanski, McHenry, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 82 days.

(21) Appl. No.: 10/624,784

(22) Filed: Jul. 22, 2003

(65) Prior Publication Data

US 2005/0029394 A1 Feb. 10, 2005

(51) Int. Cl.[7] ............................................. B64D 45/00
(52) U.S. Cl. ..................... 244/1 R; 244/129.1; 342/13
(58) Field of Search ............................... 244/1 R, 129.1, 244/137.4; 89/1.11, 1.54, 1.51; 342/13–20; 102/357, 505

(56) References Cited

U.S. PATENT DOCUMENTS

| | | | | |
|---|---|---|---|---|
| D149,555 S | * | 5/1948 | Hibbard ..................... D12/345 |
| 3,547,000 A | * | 12/1970 | Haberkorn et al. .......... 89/1.51 |
| 4,171,669 A | * | 10/1979 | Allen ......................... 102/357 |
| 4,421,007 A | * | 12/1983 | Hanes, Jr. .................... 89/1.11 |
| D355,635 S | * | 2/1995 | Raisbeck ................... D12/345 |
| 5,428,530 A | * | 6/1995 | Brown et al. ................... 703/8 |
| 5,600,434 A | * | 2/1997 | Warm et al. ........... 356/139.08 |
| 5,662,291 A | * | 9/1997 | Sepp et al. ................. 244/3.13 |
| 6,231,002 B1 | * | 5/2001 | Hibma et al. .............. 244/3.22 |
| 6,619,178 B1 | * | 9/2003 | Fransson et al. ............. 89/1.51 |
| 2002/0097390 A1 | * | 7/2002 | Hicks et al. ........... 356/139.04 |
| 2003/0205126 A1 | * | 11/2003 | O'Neill ....................... 89/1.11 |

* cited by examiner

Primary Examiner—Galen Barefoot
(74) Attorney, Agent, or Firm—Stetina Brunda Garred & Brucker

(57) ABSTRACT

A conformal air defense (CAD) system is provided which is adapted to be attached externally to an aircraft as an appendage. The CAD system includes a conformal mounting adapter having an aircraft-to-adapter interface and upper adapter side. A mounting structure is provided which has an adapter interface and a mounting side, wherein the adapter interface is attached to the upper adapter side. A missile countermeasures system is mounted on the mounting side of the mounting structure. And a cover substantially encloses the countermeasures system, wherein the cover is removably fastened to the mounting side of the mounting structure.

22 Claims, 3 Drawing Sheets

CONFORMAL AIRLINER DEFENSE (CAD) SYSTEM

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention is related to missile countermeasures systems for aircraft. In particular, the present invention is a Conformal Airliner Defense (CAD) system entirely contained within a conformal external mounting system which can be easily installed onto and removed from an external surface of an aircraft fuselage. The system may be economically fitted onto any large aircraft, including commercial aircraft and can be utilized to protect the aircraft from infrared (IR) missiles including man-portable air defense (MANPADS) missiles.

2. Background of the Invention

Infrared countermeasures systems which protect military aircraft from handheld or shoulder-fired missiles, such as "Stinger" missiles, are known in the art. These systems, such as Directional Infrared Countermeasure (DIRCM) systems, detect and track a signature associated with an approaching missile, and generate high power infrared laser signals which are transmitted as a countermeasure to confuse and defeat the attacking missile guidance system. Directional infrared countermeasure systems typically utilize an infrared-wavelength source which is passed through a rotating ball turret which is attached to the aircraft fuselage. The system also deploys numerous sensors mounted in various positions on the outside skin of the aircraft. Typically, electronic "black" boxes affiliated with the system are normally integrated into the interior of the aircraft and communicate via an avionics bus located within the fuselage of the aircraft.

With the recent substantial increase in terrorism activity directed towards commercial airliners and current ongoing Homeland Security initiatives, attempts have been made to provide commercial airliners with infrared countermeasures systems having similar capabilities to the systems utilized on military aircraft. Ideally, the known infrared countermeasures systems already being utilized by military aircraft could be installed directly on commercial aircraft giving the commercial aircraft the same level of protection that is afforded to state-of-the-art military aircraft.

However, a major drawback to this proposed solution is that the known military countermeasures systems are specifically designed for military aircraft which are specially configured to accept the aforementioned system components, including the infrared energy sources, turrets, sensors, electronic black boxes and interconnection wiring. For example, a military aircraft specified countermeasures system design typically utilizes a distributed architecture having the various components of the system mounted in several different places on the aircraft. The various components are interconnected by wire harnesses running throughout the aircraft's fuselage. These components are strategically placed within the aircraft's fuselage to insure proper external coverage, alignment, wiring interconnection, as well as weighting and balancing of the aircraft. Also, the turret and sensors are similarly strategically positioned on the aircraft at positions in which they will not be a detriment to the aircraft's aerodynamic characteristics, and yet still be able to function effectively.

On the other hand, none of the commercial airliners in service today are designed or modified to accept the aforementioned military infrared countermeasures systems. Furthermore, installation of these military systems will require extensive modifications to the various commercial airliners being utilized in the carriers' fleets. Such modifications will be extremely expensive and in most cases impracticable. Moreover, extensive recertification of the commercial airliners, due to the major modifications performed on the aircraft, will further increase the cost to install the military specified infrared countermeasures systems. As a result, the proposed solution of installing existing military infrared countermeasures systems onto currently deployed commercial airliners in the same manner that they are installed on military aircraft appears to be a very impracticable approach.

Another attempt to solve the current terrorism dilemma has been to consider utilizing a conventional flare ejecting system also known and traditionally utilized on military aircraft. With this system, flares are ejected from the aircraft which burn hot enough to draw a heat-seeking missile towards the flare. Unfortunately, utilizing flares is considered a problematic solution for commercial aircraft since the Federal Aviation Administration has commented that it would have problems certifying a system that dropped flares over populated areas.

It would be desirable to develop a missile countermeasures system which can utilize the current state-of-the art military countermeasures technology (i.e., off-the-shelf components), yet, still overcome the aforementioned aircraft installation disadvantages. For instance, with respect to available countermeasures technology, there is no need to redesign the existing rotating turrets, sensors, and supporting electrical black boxes which define a state-of-the-art infrared detecting missile countermeasures system. However, what is needed is a design which allows such components to be economically installed and utilized on currently deployed commercial aircraft without extensive modifications. Moreover, the countermeasures system should be easy to certify, maintain, and operate.

SUMMARY OF THE INVENTION

According to an aspect of the present invention, a conformal air defense (CAD) system is provided which is adapted to be attached externally to an aircraft as a surface mounted appendage. The CAD system includes a conformal mounting adapter having an aircraft-to-adapter. A mounting structure is provided which houses all of the system components and which interfaces to the aircraft specific adapter. Also, a cover substantially encloses the countermeasures system components, wherein the cover is removably fastened to the mounting side of the mounting structure.

Another aspect of the present invention includes the aircraft-to-adapter interface being adapted to conform to an external surface of the aircraft. A further aspect of the present invention includes the CAD being a standalone unit requiring only a power source from the aircraft.

In yet another aspect of the present invention, the cover has a canoe shape. According to still yet another aspect of the present invention, the cover has a starboard side surface and port side surface oriented in a longitudinal manner which connect together to form a leading and trailing edge. In another aspect of the present invention, the cover has a bottom surface with exterior edges connected to lower edges of the starboard side surface and port side surface, wherein the bottom surface extends and connects to the leading and trailing edge. Additionally, the cover may have a half-spherical shape, a tear drop shape, or an elliptical bubble shape.

Moreover, according to a further aspect of the invention, the cover has at least one turret opening adapted to receive a rotating laser turret. According to other aspects of the present invention, the at least one turret opening is located on the bottom surface of the cover. Furthermore, another aspect of the present invention provides the cover having at least one transmissive window. Another aspect of the present invention provides a cover having at least one fairing opening to receive an sensor mounting structure.

Additionally, the present invention provides a countermeasures system including at least one sensor, at least one rotating laser turret, at least one electronic box, and a single power cable. Moreover, according to another aspect of the present invention the mounting structure includes at least one sensor mounting structure, at least one laser turret mounting structure, and at least one mounting support.

According to another aspect of the present invention, the countermeasures system operates autonomously requiring no crew interaction via aircraft cabin controls. According to still a further aspect of the present invention, the conformal mounting adapter has an aircraft-to-adapter interface adapted to fit specific aircraft mold lines and mounting hole locations. Moreover, according to another aspect, the mounting structure, missile countermeasures system, and cover are provided as a single common line replacement unit capable of being installed on a plurality of aircraft designs.

According to yet another aspect of the present invention, the countermeasures system includes at least one missile detection and warning receiver to observe attacks; a countermeasure processor to verify an attack and direct a countermeasure response; a gimballed fine track sensor that acquires and tracks attacking missiles; and a modulated directed infrared countermeasure source for jamming and disrupting the missile guidance capabilities. For instance, the countermeasures system may be a Directional Infrared Countermeasure (DIRCM) system.

Furthermore, an additional embodiment of the present invention is a method for fitting a commercial aircraft with a conformal airliner defense (CAD) system. The system includes a countermeasures system contained within a conformal external mounting system. The method includes attaching a conformal mounting adapter to an exterior of an aircraft; fastening a mounting support structure, with the countermeasures system mounted thereon, to the conformal mounting adapter; and fastening a cover to the support structure which substantially encloses the countermeasures system. The method may also include connecting a power cable connector from the countermeasures system to a power source contained within the aircraft. And the method may include performing a diagnostic check-out of the countermeasures system prior to installation onto the aircraft, wherein the diagnostic check-out is performed independently of the aircraft.

According to still a further aspect of the present invention, another embodiment is provided which is a conformal external mounting system for a missile countermeasures system. The system is adapted to be exteriorly mounted to a fuselage of an aircraft as an appendage. The system includes a conformal mounting adapter configured to be attached to an aircraft fuselage; a mounting structure configured to be fastened to the conformal mounting adapter and configured to receive a missile countermeasures system; and a cover configured to substantially enclose the mounting structure and countermeasures system. Also, the conformal external mounting system and the missile countermeasures system can be removed, replaced and installed as a complete and entire line replaceable unit. Moreover, another aspect of the invention provides a single electrical power cord from the countermeasures system to be connected to an aircraft's power supply.

According to a still further aspect of the present invention, another embodiment is provided which is an aircraft in combination with a conformal airliner defense (CAD) system exteriorly attached as an appendage to said aircraft. The CAD system includes a conformal mounting adapter attached to an exterior surface of the aircraft; a mounting structure attached to an upper surface of the mounting adapter; a missile countermeasures system mounted onto the support structure; and a cover substantially enclosing the countermeasures system and removably fastened to the support structure. The mounting adapter, mounting structure, and cover are configured to form an aerodynamic appendage. Moreover, the countermeasures system is self-contained, standalone and completely operable independent of pilot input and control, requiring only a power source from said aircraft's power supply.

There are many advantages that the CAD system provides over other proposed countermeasures systems with respect to commercial aircraft. For instance, the CAD allows factory alignment of system components, not alignment on the aircraft. Complete system diagnostic check-outs may be performed on the system prior to installation onto the aircraft. Also, the design of the present invention maximizes single transmitter infrared countermeasures (IRCM) coverage during the critical and vulnerable take off and landing phases of a flight. Additionally, the CAD system minimizes integration efforts by requiring minimal airframe reinforcement, a single power line/connector and no interior removal/replacement. Further, the present invention minimizes aircraft down-time (i.e., out-of-service time) for installation and removal. Moreover, the CAD system can be operated autonomously, meaning that no crew interaction is required to operate the system. And, the CAD system can be easily configured and quickly "role fitted" to suit operational needs.

Furthermore, the CAD system is designed to minimize the amount of aircraft modifications needed to attach the CAD system for the first time and minimize the number of attachments required to attach the CAD in times of crisis. The CAD system is also designed to minimize electrical interfaces to and from the aircraft. Moreover the present invention is designed to minimize the impact of the CAD on the host aircraft's performance, stability, and control characteristics, and further configured to minimize the impact to drag and fuel consumption due to the CAD installation. Additionally the present invention is configured to enable rapid CAD removal and replacement for maintenance, and to permit rapid dismounting of the CAD for contingency storage when threat levels are low.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention is referred to as a Conformal Airliner Defense (CAD) system. CAD includes a conformal external mounting system 2 that is capable of carrying a Directional Infrared Countermeasure (DIRCM) system, or other countermeasures systems, are capable of protecting large aircraft, such as commercial airliners, by detecting an attack on the aircraft from a man-portable air defense system (MANPADS) missile and by defeating the attack through the use of a modulated infrared jamming signal.

The DIRCM system integrated into the CAD has four main system components, including: (1) missile detection and warning receivers having a large field-of-regard that can observe nearly all attacks, (2) a countermeasure processor that verifies the attack and directs a countermeasure response, (3) a gimballed fine track sensor that acquires and tracks the attacking missile, and (4) a modulated directed infrared countermeasure source that jams and disrupts the missile's guidance capabilities.

It should be noted that for exemplary purposes, a Directional Infrared Countermeasure (DIRCM) system is described within this disclosure; however, the scope of the present invention should not be limited only to the DIRCM countermeasures system. Rather, other variants of electronic infrared countermeasures systems may also be utilized in place of the DIRCM countermeasures system in combination with other features of the present invention described herein below.

Figure 1A:
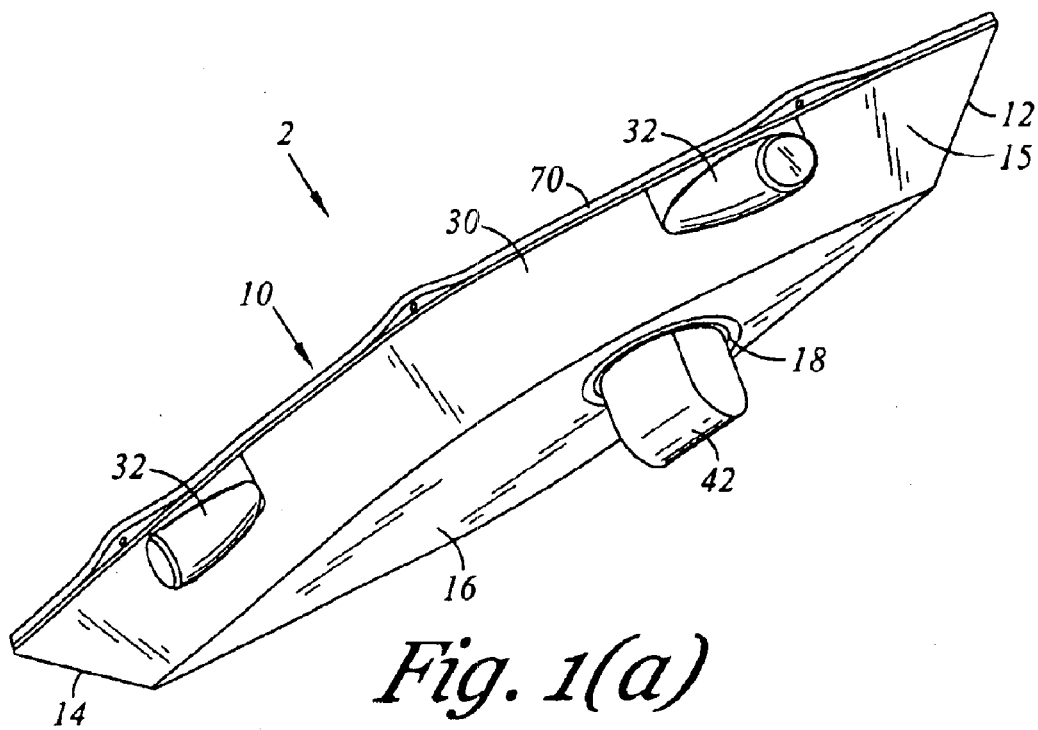
FIG. 1(a) is a bottom perspective view of an exemplary embodiment of a CAD system, and in particular, a conformal external mounting system.
Figure 1B:
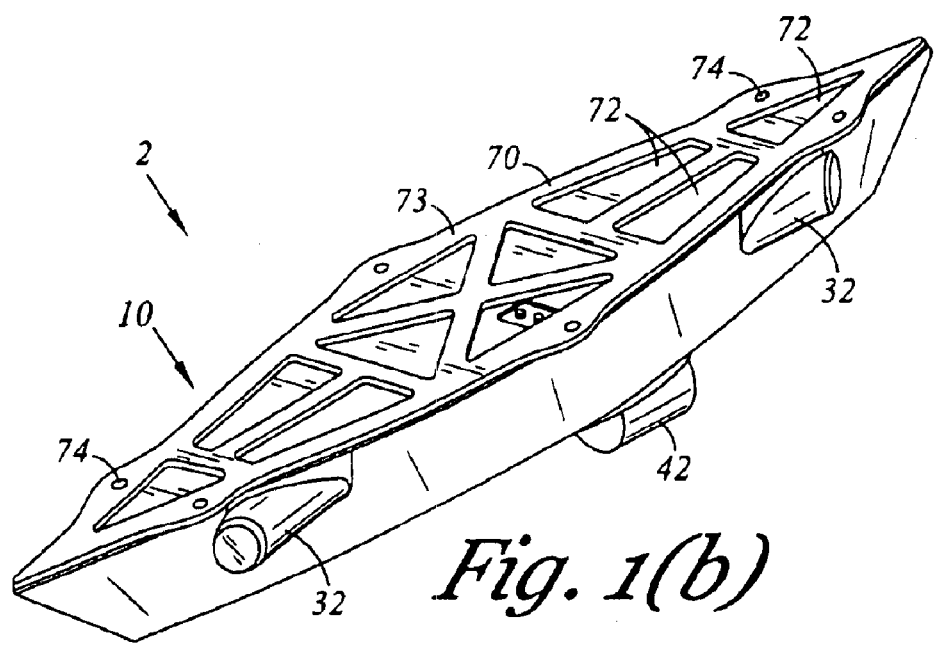
FIG. 1(b) is an upper perspective view of the exemplary embodiment of the CAD system shown in FIG. 1(a)
Figure 2:
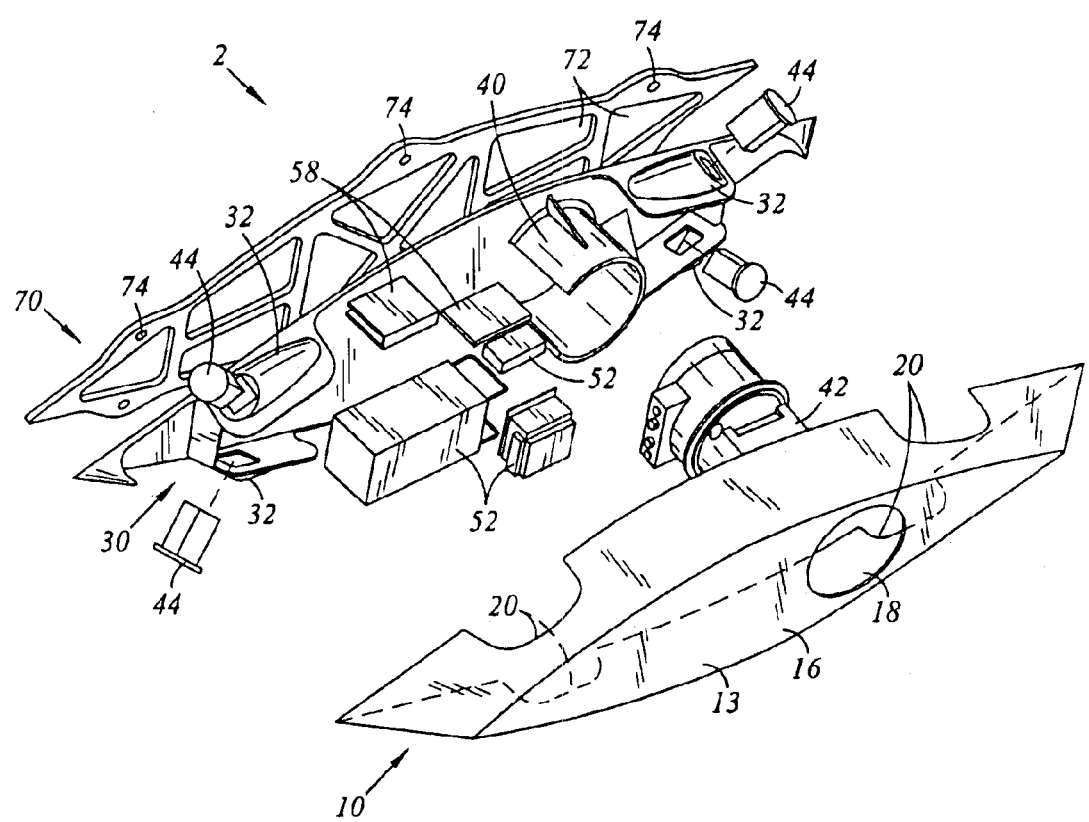
FIG. 2 is an exploded view of an exemplary embodiment of the CAD system, which reveals details of the conformal external mounting system shown in FIGS. 1(a) and 1(b)

FIGS. 1(a)–(b) and FIG. 2 depict an exemplary embodiment of a conformal external mounting system 2 that carries an DIRCM system or other countermeasures system. The conformal external mounting system 2 includes a rigid common equipment mounting structure 30, a canoe shaped cover 10 (or aerodynamic fairing), and a conformal mounting adapter 70 or (or adapter plate). The common mounting structure 30 holds all countermeasures systems components secure and in alignment relative to one another. The conformal mounting adapter 70 employs a minimum of fasteners to mount to the exterior surface of an aircraft with a minimum of skin penetrations and aircraft modifications. The canoe shaped cover 10 is provided to cover mounting structure 30 and the countermeasures equipment. Cover 10 provides a clean, sealed, self-contained and thermally controlled environment for the countermeasures equipment, providing low drag characteristics, and minimal airflow disruption over the exterior surface of the aircraft. The conformal mounting adapter 70 is an aircraft specific design which adapts mounting structure 30 and cover 10 to each specific aircraft moldline and provides fastener provisions allowing a common CAD design to be used on many aircraft types and models.

FIG. 1(a) is a bottom perspective view of the CAD system, in particular, conformal external mounting system 2. Canoe shaped cover 10 is provided has a longitudinal length which terminates at forward leading edge 12 and trailing edge 14. The cover 10 includes a port side surface 13 (see FIG. 2) and starboard side surface 15 which forms leading edge 12, trailing edge 14, and the outer edges of bottom surface 16. Located on bottom surface 16 is turret opening 18 which receives a rotating turret 42 incorporating an infrared wavelength laser source in the exposed head of the turret. Also shown in FIG. 1(a) are sensor mounting structures 32 and sensors 44 which are mounted within sensor mounting structures 32.

FIG. 1(b) is a top perspective view of the CAD system, and in particular, conformal external mounting system 2. From this perspective, mounting adapter 70 is clearly visible. As previously mentioned, mounting adapter 70 is used to mount the conformal external mounting system 2 to the fuselage of an aircraft. The embodiment shown in FIG. 1(b) depicts a lattice framework design 72 of the mounting adapter 70 having fastening tabs (6 places). It is noted that mounting adapter 70 may be constructed utilizing various designs, materials, fasteners, forms and shapes depending on each specific aircraft. Furthermore, as previously described, conformal mounting adapter 70 is designed to receive mounting structure 30, the configuration which may remain constant, while simultaneously being conformed to a variety of aircraft exterior shapes or moldlines. Thus, aircraft-to-mounting adapter interface 73 will have various adaptations/embodiments depending the specific aircraft.

FIG. 2 is an exploded view of the same exemplary embodiment of the CAD system, and in particular, conformal external mounting system 2 which was shown in FIGS. 1(a) and 1(b). The main structural component of conformal external mounting system 2 is mounting structure 30. Mounting structure 30 includes sensor mounting structures 32 (four places) having cylindrically-shaped housings which protrude from the structures main moldlines to position the sensor at the correct field of view the conformal external mounting system 2 is assembled, as depicted in FIGS. 1(a) and 1(b). Additionally, sensors 44 are installed within sensor housing mounting structures 32. Each sensor 44 includes an transmissive window for sensing the missile plume. A rotating turret receiving mounting structure 40 is provided on mounting structure 30 for receiving rotating laser turret 42. Various mounting supports 58 for example, may be provided for attaching countermeasures system components 52 to mounting structure 30. FIG. 2 further illustrates fairing openings 20 (four places) in cover 10 which are adapted to receive sensor housing mounting structures 32.

Figure 3:
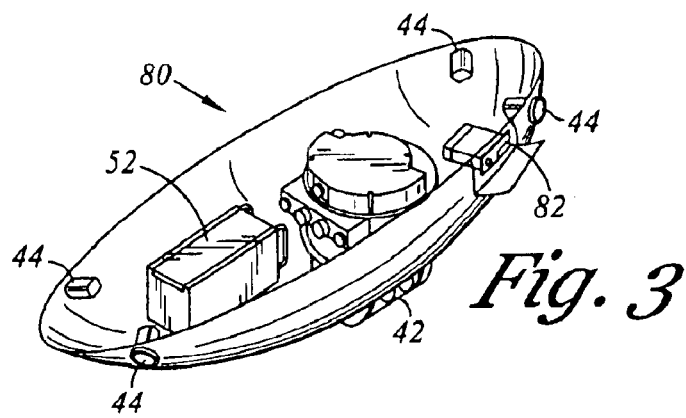
FIG. 3 is an alternative exemplary embodiment of the CAD.

FIG. 3 is an alternative exemplary embodiment of the conformal external mounting system 2. This embodiment provides an elliptically shaped bubble cover 80. Otherwise, the embodiment utilizes the same components as the embodiment illustrated in FIGS. 1 and 2, including mounting structure 30 (not illustrated), sensors 44 (four places), rotating laser turret 42, and countermeasures systems components 52.

Figures 4A, 4B:
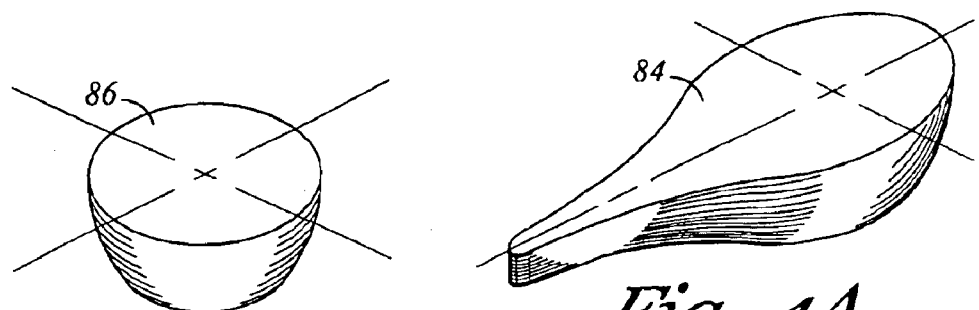
FIGS. 4(a) and 4(b) depict alternative exemplary embodiments of the cover.

FIGS. 4(*a*)–(*b*) show alternative embodiments of the cover. For example, the cover may take the form of variety of shapes such as a tear drop shape 84, a half spherical shape 86, or any other shape which provides aerodynamic stability and efficiency for conformal external mounting system 2. In general, the shape of cover should be designed to minimize the impact of the CAD on the host aircraft's performance, stability and control characteristics. Moreover the shape of the cover should be designed to minimize the impact to drag and fuel consumption.

Figure 5:
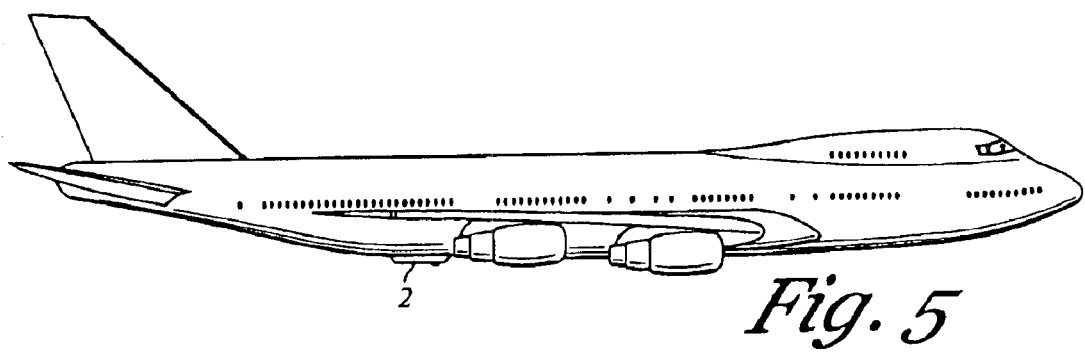
FIG. 5 illustrates an exemplary placement of the CAD on an aircraft.

FIG. 5 illustrates an exemplary placement the CAD system on an aircraft. It should be noted that the placement of the conformal external mounting system 2 will be dependent on a variety of factors, including the specific aircraft in which conformal external mounting system 2 will be installed, weighting and balancing factors of the specific aircraft, field of view requirements, and the aerodynamic characteristics of both the conformal external mounting system 2 and the aircraft when the CAD system is installed on the aircraft. Therefore, the placement position of the CAD system on an aircraft may vary.

It is also noteworthy to mention that the CAD system is not only limited to commercial aircraft. The CAD system may also be installed on private aircraft ranging from small propeller planes to private jets, such as Lear jets and Gulf Streams. Moreover, CAD system may be installed on existing military aircraft. And furthermore, the CAD system may be installed on commercial, private, or military helicopters.

The following section will now briefly describe an exemplary installation sequence of the CAD system. Once a proper position for conformal external mounting system 2 has been determined, a power source connector will have to be provided from the aircraft's wiring harness to a removable panel, hatch or bulkhead near the desired mounting position. Fastening hardware receptacles configured in the same footprint of the mounting adaptor 70 will have to be provided to mount adapter 70 to the external surface of the airplane. Next, a power cable (not illustrated) leading from conformal external mounting system 2 should be connected to the power source connector on the aircraft. Mounting adapter 70, with CAD system attached may then be fastened to the aircraft exterior.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed:

1. A self-contained and standalone conformal air defense (CAD) system adapted to be attached externally to a surface of an aircraft as an appendage, the system comprising:

a conformal mounting adapter having an aircraft-to-adapter interface and upper adapter side, said aircraft-to-adaptor interface configured to conform to the surface of the aircraft;

a mounting structure having an adapter interface and a mounting side, said adapter interface attached to said upper adapter side;

an electronic infrared countermeasures system (IRCM) mounted on said mounting side of said mounting structure, said infrared countermeasures system configured for directing an infrared laser source at an attacking missile to confuse the missile's guidance system; and a cover substantially enclosing said countermeasures system, said cover removably fastened to said mounting side of said mounting structure, wherein the system is configured to operate autonomously independent of crew interaction, requiring only a power source from the aircraft.

2. The system according to claim 1, said cover having a canoe shape which includes a starboard side surface and port side surface oriented in a longitudinal manner which connect together to form a leading and trailing edge, and a bottom surface with exterior edges connected to lower edges of said starboard side surface and port side surface, said bottom surface extending and connecting to said leading and trailing edge.

3. The system according to claim 1, said cover having a half-spherical shape.

4. The system according to claim 1, said cover having a tear drop shape.

5. The system according to claim 1, said cover having an elliptical bubble shape.

6. The system according to claim 1, said cover having at least one turret opening adapted to receive a rotating laser turret.

7. The system according to claim 6, said at least one turret opening located on said bottom surface of said cover.

8. The system according to claim 1, said cover having at least one infrared transmissive window.

9. The system according to claim 1, said cover having at least one fairing opening to receive an sensor housing mounting structure.

10. The system according to claim 1, said countermeasures system including at least one sensor, at least one rotating laser turret, at least one electronic box, and a single power cable.

11. The system according to claim 1, said mounting structure further having a canoe-shaped outer perimeter defined by a pair of opposing pointed terminus ends, said mounting structure further including at least one sensor mounting structure formed about said perimeter in a generally orthogonal orientation to said mounting side, at least one laser turret cylindrically-shaped mounting structure connected to said mounting side in a generally orthogonal orientation with respect to said mounting side, and at least one mounting support.

12. The system according to claim 1, said conformal mounting adapter having an aircraft-to-adapter interface adapted to fit specific aircraft mold lines and structural mounting provisions.

13. The system according to claim 1, said mounting structure, said missile countermeasures system, and said cover provided as a single common line replacement unit capable of being installed on a plurality of aircraft designs.

14. The system according to claim 1, said countermeasures system comprising:

at least one missile detection and warning receiver to observe attacks;

a countermeasure processor to verify an attack and direct a countermeasure response;

a gimballed fine track sensor that acquires and tracks attacking missiles; and a modulated directed infrared countermeasure source for jamming and disrupting the missile guidance capabilities.

15. The system according to claim 14, said countermeasures system comprising a Directional Infrared Countermeasures (DIRCM) system.

16. The system according to claim 1, said conformal adapter further having a canoe-shaped outer perimeter defined by a pair of opposing pointed terminus ends, the adapter further including a lattice framework design, and a plurality of fastening tabs with holes disposed there through formed about said perimeter of the conformal adapter.

17. A method for fitting a commercial aircraft with a self-contained and standalone conformal airliner defense (CAD) system, the system comprising an electronic infrared countermeasures system (IRCM) for directing an infrared laser source at an attacking missile to confuse the missile's guidance system, wherein the countermeasures system is contained within a conformal external mounting apparatus, the method comprising:

performing a diagnostic check-out of the countermeasures system prior to installation onto the aircraft, wherein the diagnostic check-out is performed independently of the aircraft;

connecting a power cable connector from the countermeasures system to a power connector on the aircraft;

attaching a conformal mounting adapter to an exterior surface of an aircraft;

fastening a mounting support structure, with the countermeasures system mounted thereon, to the conformal mounting adapter; and fastening a cover to the support structure which substantially encloses the countermeasures system.

18. A self-contained and standalone conformal external mounting system for a housing an electronic infrared countermeasures (IRCM) system for directing an infrared laser source at an attacking missile to confuse the missile's guidance system, said conformal mounting system adapted to be mounted to an exterior surface of an aircraft as an appendage, said conformal mounting system comprising:

a conformal mounting adapter configured to be attached to the exterior surface an aircraft;

a mounting structure configured to be fastened to said conformal mounting adapter and configured to receive an electronic infrared countermeasures system; and a cover configured to substantially enclose said mounting structure and the countermeasures system;

wherein said conformal external mounting system and the countermeasures system can be removed, replaced and installed as a complete and entire line replaceable unit.

19. The conformal external mounting system according to claim 18, wherein a single electrical power cord is provided from the countermeasures system to be connected to an aircraft's power supply harness.

20. The conformal external mounting system according to claim 18, said cover having a canoe shape which includes a starboard side surface and port side surface oriented in a longitudinal manner which connect together to form a leading and trailing edge, and a bottom surface with exterior edges connected to lower edges of said starboard side surface and port side surface, said bottom surface extending and connecting to said leading and trailing edge.

21. An aircraft in combination with a self-contained and standalone conformal airliner defense system (CAD) attached as an appendage to an exterior surface of said aircraft, said CAD system comprising:

a conformal mounting adapter attached to said exterior surface of said aircraft;

a mounting structure attached to an upper surface of said mounting adapter;

an electronic infrared countermeasures system (IRCM) mounted onto said support structure, said infrared countermeasures system configured for directing an infrared laser source at an attacking missile to confuse the missile's guidance system; and a cover substantially enclosing said countermeasures system and removably fastened to said support structure;

wherein said countermeasures system is substantially self-contained, standalone and completely operable independent of pilot input and control, requiring only a power source from said aircraft's power supply.

22. The combination according to claim 21, said cover having a canoe shape which includes a starboard side surface and port side surface oriented in a longitudinal manner which connect together to form a leading and trailing edge, and a bottom surface with exterior edges connected to lower edges of said starboard side surface and port side surface, said bottom surface extending and connecting to said leading and trailing edge.

* * * * *